United States Patent [19]
Williamson

[11] Patent Number: 5,361,287
[45] Date of Patent: Nov. 1, 1994

[54] NUCLEAR FUEL ASSEMBLY LOWER END FITTING

[75] Inventor: Rick D. Williamson, Forest, Va.

[73] Assignee: B&W Fuel Company, Lynchburg, Va.

[21] Appl. No.: 219,679

[22] Filed: Mar. 29, 1994

[51] Int. Cl.⁵ .................. G21C 3/32; G21C 15/06; G21C 19/30
[52] U.S. Cl. ...................... 376/352; 376/313; 376/443
[58] Field of Search .............. 376/352, 313, 443

[56] References Cited

U.S. PATENT DOCUMENTS

| | | | |
|---|---|---|---|
| 4,036,690 | 7/1977 | Betts et al. | 376/352 |
| 4,420,457 | 12/1983 | Pargneux | 376/352 |
| 4,505,877 | 3/1985 | Rion | 376/352 |
| 4,652,425 | 3/1987 | Ferrari et al. | 376/352 |
| 4,664,880 | 5/1987 | Bryan | 376/352 |
| 4,678,627 | 7/1987 | Rylatt | 376/313 |
| 4,684,495 | 8/1987 | Wilson et al. | 376/352 |
| 4,684,496 | 8/1987 | Wilson et al. | 376/352 |
| 4,828,791 | 5/1989 | DeMario | 376/352 |
| 4,832,905 | 5/1989 | Bryan et al. | 376/352 |
| 4,900,507 | 2/1990 | Shallenberger et al. | 376/352 |
| 4,919,883 | 4/1990 | Bryan | 376/352 |
| 5,009,839 | 4/1991 | King | 376/352 |
| 5,030,412 | 7/1991 | Yates et al. | 376/352 |
| 5,037,605 | 8/1991 | Riordan | 376/352 |
| 5,094,802 | 3/1992 | Riordan | 376/352 |
| 5,167,909 | 12/1992 | Leroux | 376/352 |
| 5,225,152 | 7/1993 | Verdier | 376/352 |

*Primary Examiner*—Behrend E. Harvey
*Attorney, Agent, or Firm*—R. J. Edwards; D. Neil LaHaye

[57] ABSTRACT

A nuclear fuel assembly lower end fitting. Two plates each having a network of diagonal and lateral ribs in conjunction with hubs for the guide thimble hole pattern are provided. The pitch between ribs corresponds to one-half of the fuel rod pitch. This allows for the fuel rods to be supported by every other rib. One plate is rotated horizontally ninety degrees relative to the other plate so that the lateral ribs of the plates are at right angles. A screen formed from approximately 0.03 inch diameter wire with 0.100 inch pitch is provided with guide tube bosses. The plates and screen are rigidly attached to each other to form a debris filtering lower end fitting.

4 Claims, 2 Drawing Sheets

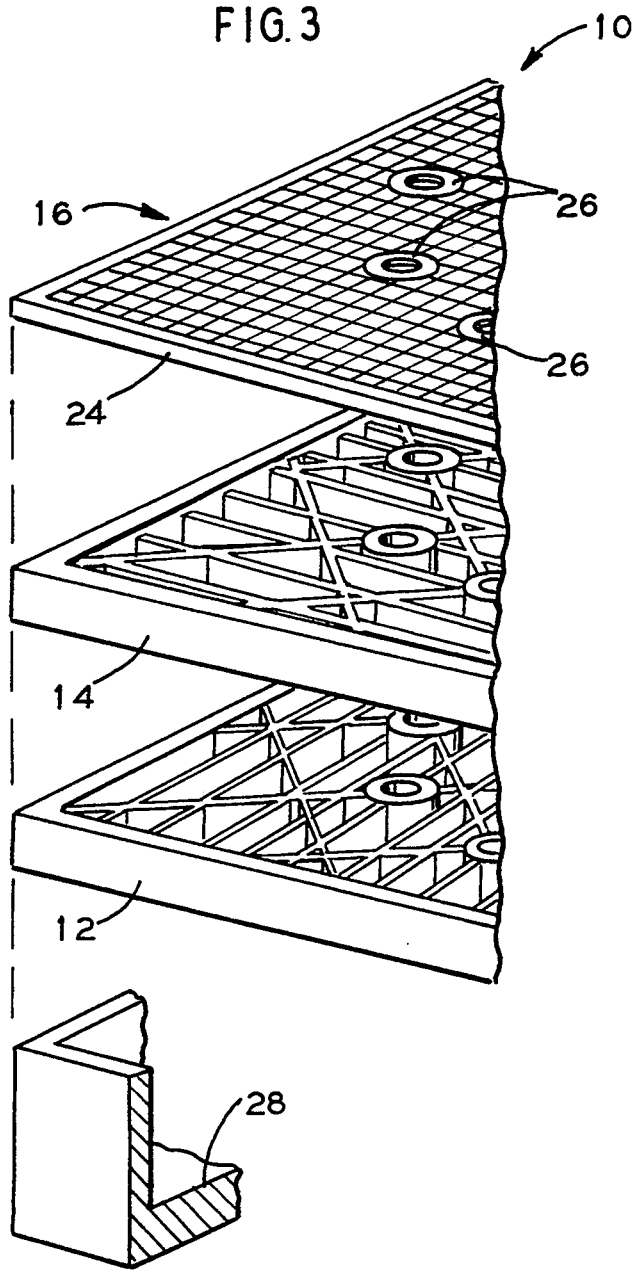

NUCLEAR FUEL ASSEMBLY LOWER END FITTING

BACKGROUND OF THE INVENTION

1. Field of the Invention

The present invention is generally related to nuclear fuel assemblies and in particular to lower end fittings and debris filters used in conjunction with nuclear fuel assemblies.

2. General Background

Commercial nuclear reactors include multiple fuel assemblies. Each fuel assembly is comprised of a number of fuel rods radially spaced apart in a parallel array by grid assemblies spaced along the length of the fuel rods. Each grid assembly is formed in an eggcrate design by multiple metal strips that criss-cross at right angles to form individual cells for each of the fuel rods. The strips are provided with tabs that project into the cells against the fuel rods. The tabs serve the purposes of holding the fuel rods in their respective radial positions and providing maximum surface area contact of the fuel rods with coolant flowing through the cells. Control rod guide thimble tubes also extend through selected cells in the grid assembly and are attached at their upper and lower ends respectively to an upper end fitting and a lower end fitting. The upper and lower end fittings are also commonly referred to in the industry as nozzle plates since they are rigid plates that provide structural integrity and load bearing support to the fuel assembly and are provided with flow apertures therethrough for coolant flow. The lower end fitting or nozzle plate is positioned directly above openings in the lower portion of the reactor where coolant flows up into the reactor to the core. The ligaments between apertures in the end fittings coincide with the ends of the fuel rods and limit upward or downward movement of the fuel rods. Debris such as metal particles, chips, and turnings is generated during manufacture, installation, and repair of the reactor, piping, and associated cooling equipment. The size and complexities of the equipment prevent location and removal of all such debris before operations are commenced. Also, some of this debris may not become loose matter in the system until the system is put into operation. It has been recognized that this debris presents a greater problem to the system than previously thought. These small pieces of debris have been found to lodge between the walls of the grid cells and the fuel elements. Movement and vibration of the lodged debris caused by coolant flow results in abrasion and removal of cladding on the fuel rods. This in turn leads to detrimental effects such as fretting of the fuel rods and failure to retain radioactive fission gas products. Such damage, although not critical to safety of the surrounding environment, can reduce operating efficiency by the need to suspend operation while replacing damaged fuel rods. It can be seen that a need exists for a debris filter capable of filtering debris of a size which may lodge between the grid cell walls and the fuel rods. An important consideration besides that of filtration is that a substantial coolant pressure drop across the filter must be avoided in order to maintain an adequate coolant flow over the fuel rods for heat removal therefrom. Patented approaches to this problem of which applicant is aware include the following.

U.S. Pat. Nos. 4,684,495 and 4,684,496 disclose debris traps formed from a plurality of straps aligned with one another in a crisscross arrangement and defining a plurality of interconnected wall portions which form a multiplicity of small cells each having open opposite ends and a central channel for coolant flow through the trap.

U.S. Pat. No. 4,828,791 discloses a debris resistant bottom nozzle which is a substantially solid plate having cut-out regions in alignment with inlet flow holes in the lower core plate. Separate criss-cross structures fixed to the plate extend across the cut-out regions to act as a debris trap.

U.S. Pat. Nos. 4,664,880 and 4,678,627 disclose debris traps mounted within a bottom nozzle that define a hollow enclosure with an opening so as to form a debris capturing and retaining chamber.

U.S. Pat. No. 4,652,425 discloses a trap for catching debris disposed between the bottom nozzle and the bottom grid. The structure forms multiple hollow cells that receive the fuel rod lower end plugs with dimples in each cell for catching debris carried into the cells by the coolant flow.

U.S. Pat. Nos. 5,009,839; 5,037,605; and 5,094,802 disclose debris filters that use two or more separate parts to form the debris filter or a plate that has the coolant flow holes formed by drilling or electrical discharge machining.

U.S. Pat. No. 4,900,507 discloses a debris filter wherein a separate filter plate is attached to a support structure.

Many of the known debris filters do not adequately address the need for effective filtration with a minimal pressure drop.

SUMMARY OF THE INVENTION

The present invention addresses the above need in a straightforward manner. What is provided is a debris filtering lower end fitting that offers substantial debris filtering features while optimizing the flow area, thus minimizing the pressure drop across the lower end fitting. The lower end fitting is formed from two plates each having a network of diagonal and lateral ribs in conjunction with hubs for the guide thimble hole pattern. The pitch between ribs corresponds to one-half of the fuel rod pitch. This allows for the fuel rods to be supported by every other rib. One plate is rotated horizontally ninety degrees relative to the other plate so that the lateral ribs of the plates are at right angles. A screen formed from approximately 0.03 inch diameter wire with 0.100 inch pitch is provided with guide tube bosses. The plates and screen are rigidly attached to each other to form a debris filtering lower end fitting.

BRIEF DESCRIPTION OF THE DRAWINGS

For a further understanding of the nature and objects of the present invention reference should be had to the following description, taken in conjunction with the accompanying drawings in which like parts are given like reference numerals, and wherein:

FIG. 3 is an exploded partial perspective view of the invention.

DETAILED DESCRIPTION OF THE PREFERRED EMBODIMENT

Figure 1:
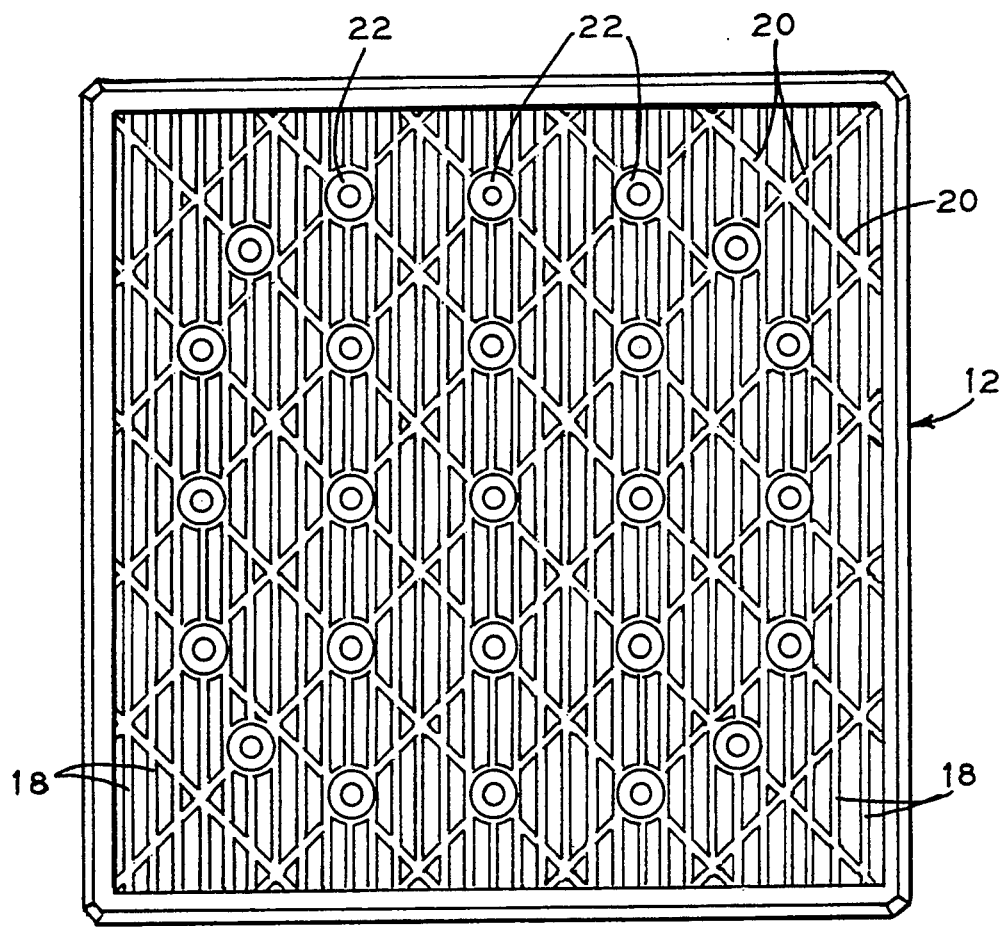
FIG. 1 is a plan view of one plate of the invention.

Referring to the drawings it is seen in FIG. 3 that the invention is generally referred to by the numeral 10.

Lower end fitting 10 is generally comprised of first rigid plate 12, second rigid plate 14, and screen 16.

Figure 2:
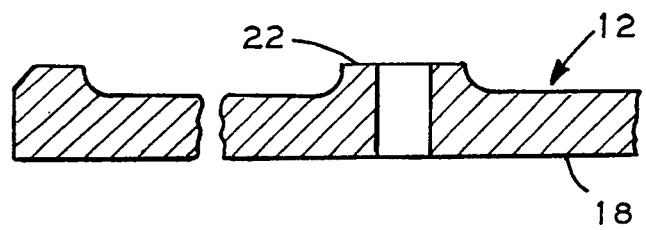
FIG. 2 is a partial side cutaway view of the plate of FIG. 1.

First and second plates 12, 14 are identical in construction and form and both will be described by reference to first plate 12 in FIGS. 1 and 2. First plate 12 is a substantially square plate formed by any suitable means such as casting. As seen in FIG. 1, first plate 12 has a rigid outer perimeter with a plurality of parallel lateral ribs 18 that extend between two opposing sides of the plate and are parallel to the remaining two sides of the plate. A plurality of spaced apart parallel diagonal ribs 20 are provided that extend across the plate at approximately a forty-five degree angles to the sides. Two sets of diagonal ribs 20 are provided that cross at right angles. A plurality of guide tube hubs 22 are provided for receiving the guide tubes (not shown) that are attached to the upper and lower end fittings in a fuel assembly. As seen in the cross section of FIG. 2, the rib material is preferably thicker at the guide tube hubs 22 to provide adequate support for attachment of the guide tubes. The pitch or spacing between ribs 18 is designed to correspond to one-half the fuel rod pitch that the end fitting is designed for. This spacing allows for a fuel rod in the assembly to be supported by every other rib.

As seen in FIG. 3, screen 16 is formed from a plurality of parallel and right angle intersecting wires that are spaced apart to define filtration holes between the wires. In the preferred embodiment, the wire is approximately 0.03 inch diameter with a 0.100 inch pitch or spacing between the wire centers. This provides a plurality of filtration holes of approximately 0.07 inch across screen 16. Screen 16 is provided with a rigid border 24 that is approximately one-eighth inch thick and wide in the preferred embodiment. This adds rigidity to the screen and provides a welding point for attachment to second plate 14. A plurality of guide tube bosses 26 are provided on screen 16 in a pattern that matches the pattern of guide tube hubs 22 on first and second plates 12, 14. For additional strength, the guide tube bosses 26 may also be thicker than the wire, such as one-eighth inch thick.

In the assembled form, first plate 12 may have a leg 28 rigidly attached at each corner for installation in the reactor core. As seen in FIG. 3, second plate 14 is rotated horizontally ninety degrees relative to first plate 12 such that the lateral ribs of said first and second plates are at right angles to each other. Second plate 14 is rigidly attached to first plate 12 in this position and screen 16 is rigidly attached to second plate 16. Attachment between the plates and screen may be by any suitable method such as welding. The right angle between ribs on adjacent plates and the holes in screen 16 provide a semi-torturous path that will act to cull out large debris and provide the structural support required by the lower end fitting during handling and operation. The upper surface of plates 12, 14, which is preferably machined to provide a consistently level surface, provides a seating surface for fuel rods, if required, through screen 16. The screen will filter out small debris such as wires. Plates 12, 14 are preferably cast to reduce manufacturing costs. The combination of the plates and screen optimizes flow and minimizes pressure drop related to the debris filtering characteristics. It should be noted that the spacing arrangement of guide tubes in nuclear fuel assemblies is symmetrical so that overlap of the guide tube hubs by rotation of one plate relative to the other is not affected and does not require separate plate configurations. The drawings illustrate the plates and screen as designed for a seventeen by seventeen fuel assembly but it should be understood that the invention may be used with any size fuel assembly with the proper spacing between ribs.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. In a nuclear fuel assembly having a plurality of fuel rods held in a spaced array by grid assemblies, guide tubes extending through the grid assemblies and attached at their upper and lower ends to an upper end fitting and a lower end fitting, the lower end fitting comprising:
   a. a first rigid substantially square plate, said first plate being formed from a network of diagonal and lateral ribs in conjunction with guide tube hubs, with the pitch between ribs corresponding to one-half of the fuel rod pitch;
   b. a second rigid substantially square plate being formed from the same configuration of ribs and guide tube hubs as said first plate, said second plate being rotated horizontally ninety degrees relative to said first plate and rigidly attached to said first plate such that the lateral ribs of said first and second plates are at right angles; and
   c. a screen rigidly attached to said second plate, said screen being formed from approximately 0.03 inch diameter wire with 0.100 inch pitch and having guide tube bosses at positions that correspond to the guide tube hubs in said first and second plates.

2. The lower end fitting of claim 1, wherein said screen is provided with a border having a thickness and width of approximately one-eighth inch.

3. The lower end fitting of claim 1, wherein the guide tube bosses on said screen are approximately one-eighth inch thick.

4. In a nuclear fuel assembly having a plurality of fuel rods held in a spaced array by grid assemblies, guide tubes extending through the grid assemblies and attached at their upper and lower ends to an upper end fitting and a lower end fitting, the lower end fitting comprising:
   a. a first rigid substantially square plate, said first plate being formed from a network of diagonal and lateral ribs in conjunction with guide tube hubs, with the pitch between ribs corresponding to one-half of the fuel rod pitch;
   b. a second rigid substantially square plate being formed from the same configuration of ribs and guide tube hubs as said first plate, said second plate being rotated horizontally ninety degrees and rigidly attached to said first plate such that the lateral ribs of said first and second plates are at right angles; and
   c. a screen rigidly attached to said second plate, said screen having a border approximately one-eighth inch thick and wide and being formed from approximately 0.03 inch diameter wire with 0.100 inch pitch and having guide tube bosses approximately one-eighth inch thick at positions that correspond to the guide tube hubs in said first and second plates.

* * * * *